Nov. 14, 1933.  A. G. HEWITT  1,935,267
INSPECTION APPARATUS
Filed Dec. 22, 1930  2 Sheets-Sheet 1
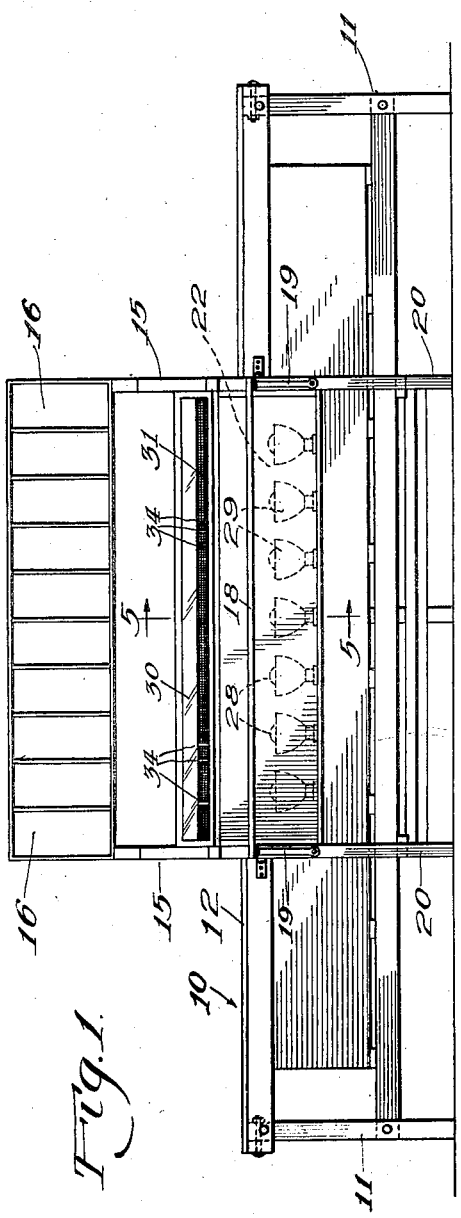
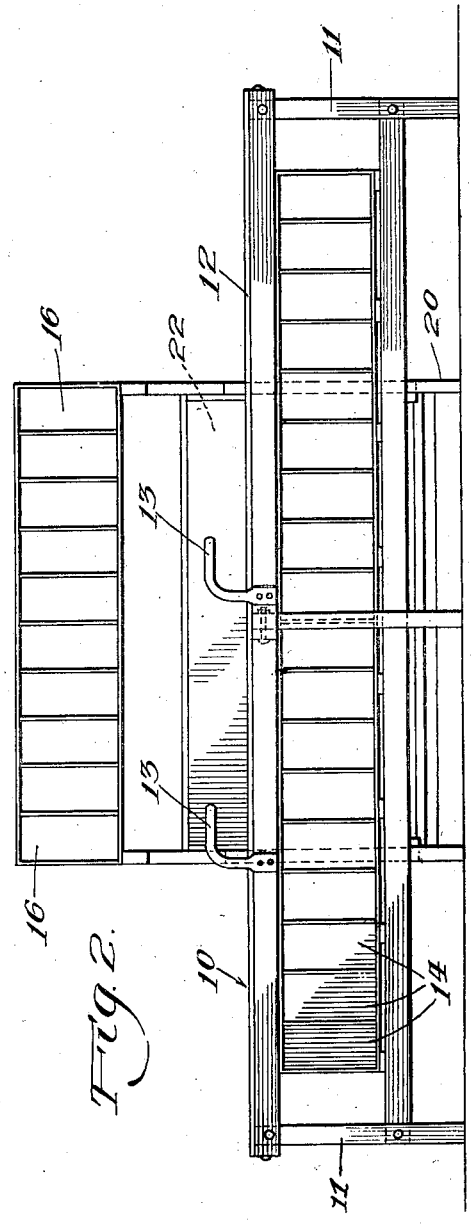
Inventor:
Alfred G. Hewitt,
By Dynnforth, Lee Chritton & Wiles
Attys.

Nov. 14, 1933. A. G. HEWITT 1,935,267
INSPECTION APPARATUS
Filed Dec. 22, 1930  2 Sheets-Sheet 2
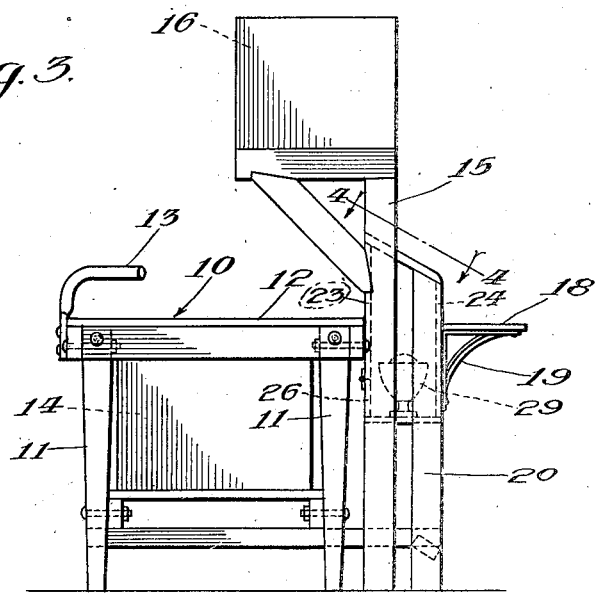
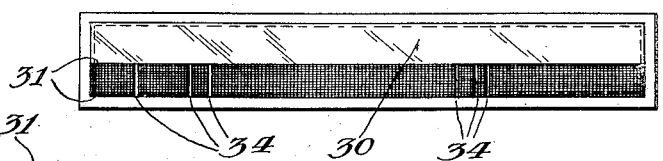
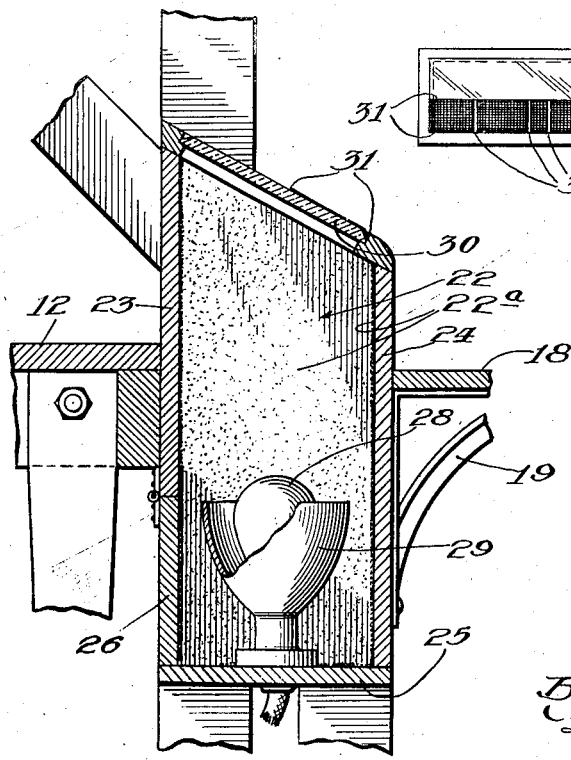
Inventor:
Alfred G. Hewitt
By Dynenforth, Lee, Chritton & Wiles
Attys.

Patented Nov. 14, 1933

1,935,267

UNITED STATES PATENT OFFICE 1,935,267

INSPECTION APPARATUS

Alfred G. Hewitt, Chicago, Ill., assignor to The Visking Corporation, Chicago, Ill., a corporation of Virginia Application December 22, 1930
Serial No. 504,168

1 Claim. (Cl. 88—14)

The invention relates to inspection apparatus, and more particularly to apparatus which may be utilized in the inspection of cellulose tubing, or the like.

Cellulose tubing which is employed as sausage casings, etc., may be produced by extruding viscose through an annular orifice and then subjecting the extruded tubing to coagulating or regenerating baths. The regenerated tubing is washed in water and treated with a softening agent, preferably glycerine. After the glycerine treatment, the tubing is dried and if it is to be employed as casings for the larger sized sausages, it is cut into predetermined lengths. Before the lengths of tubing can be shipped to the sausage manufacturer, they must be inspected for faults and variations in size.

Apparatus embodying the present invention is particularly adapted for use in connection with the inspection of sausage casings of the type described and provides means whereby such inspection can be made easily and quickly. The apparatus preferably includes means for assembling the casings in flat bundles which may be shipped to the sausage manufacturer.

Many other objects and advantages of the invention will become apparent as the following detailed description progresses, reference being had to the accompanying drawings, wherein:

Figure 1 is a front elevation of apparatus embodying the invention.

Fig. 2 is a rear elevation of the apparatus shown in Fig. 1.

Fig. 3 is an end elevation of the improved apparatus.

Fig. 4 is a section taken on line 4—4 of Fig. 3, and

Fig. 5 is an enlarged section taken on line 5—5 of Fig. 1.

Referring to the drawings wherein a preferred embodiment of the invention is illustrated, the reference character 10 designates a table which is provided with legs 11 and a table-top 12. Secured to one edge of the table-top 12 are a plurality of bent bars 13, the purpose of which will presently appear. Disposed beneath the table-top are a plurality of compartments 14 in which lengths of cellulose sausage casing may be stored.

Secured to the table-top 12 are vertically disposed posts or standards 15 which carry a plurality of compartments 16 which are accessible to an operator standing before the table 10, and also accessible to an operator standing before a shelf 18 mounted upon brackets 19 which are secured to posts 20 associated with the posts or standards 15.

A chamber 22 is provided between the table 10 and the shelf 18, the chamber 22 extending from one post 15 to the other (see Figs. 1 and 5). The chamber 22 is enclosed within side walls 23 and 24 and a bottom wall 25. A door 26 provided in the wall 23 permits access to the chamber 22 so that electric lamps 28 provided in the chamber 22 may be replaced when it is necessary to do so. Each lamp 28 is provided with a reflector 29.

The interior surfaces of the walls enclosing the chamber 22 as well as the interior surface of the door 26 may be painted a dull black so that there will be little reflection from them, but in the preferred embodiment of the invention, any paint or varnish, or an adhesive substance is employed, finely divided carbon, or the equivalent, being applied to the coating of paint, varnish or adhesive while it is still wet. The finely divided carbon insures that a minimum of light will be reflected from the inner surfaces of the walls forming the chamber 22. The coatings of adhesive and powdered carbon are indicated at 22a. The upper end of the chamber 22 is closed by a glass 30 which is inclined to the horizontal and is positioned so that an operator standing before the shelf 18 may readily place lengths of cellulose sausage casings on the glass and inspect them. The lower end of the upper surface of the glass 30 is provided with a coating 31 of black paint or enamel, and in this coating lines 34 are scratched so that the light from the lamps 28 is projected therefrom.

When the lengths of sausage casings are delivered to the operator, who is to inspect them, they are in collapsed or flattened condition. The operator first tests the diameter of each length by placing it in its flattened condition transversely of the glass 30 over a group of lines 34. The lines 34 are spaced to indicate minimum and maximum limits of diameter and if the diameter of a length of casing is not within the proper limits, it is discarded. After the test for diameter, the operator places the length of casing on the uncoated portion of the glass 30 so that the light from the lamps 28 is projected through it. Any imperfections in the casing will become apparent; thus any slits, holes, folds, wrinkles, etc., may be noted by the operator and if the fault is a major one, the length of casing is discarded. The discarded lengths of casing are preferably placed in the compartment 16 which are properly labeled to indicate the imperfections in the casings placed therein. Thus, one compartment would be provided for casings which were too large in diameter, and another for casings which were too small in diameter. Another compartment would be provided for casings which were wrinkled or folded and still another compartment would be provided for casings which were punctured. The operator standing before the shelf 18 passes the perfect casings through the opening underneath the compartment 16, these casings being received by an operator standing before the table 10.

The operator standing before the table 10 piles the casings in bundles of a predetermined number, there being preferably ten casings in each bundle. This operator then grasps the ends of each bundle in his hands and draws the bundle back and forth over one of the bars 13 to flatten the individual casings and the bundle. The flattened bundles are placed to one side and when a sufficient number has been assembled they are transferred to the shipping department.

An advantage of the improved construction is that the light shines directly through the casings while being inspected but does not strike the eyes of the operator. The gage marks 34 cut in the coating 31 are very prominent and no strain is placed upon the eyes of the operator when the casings are tested for diameter.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible, in view of the prior art.

What I claim as new, and desire to secure by Letters Patent, is:

Inspection apparatus of the kind described comprising a transparent panel for supporting an article which is to be inspected, said panel being disposed at an angle to the horizontal and the vertical, a substantially opaque coating on the lower portion of said panel, said coating having gauge lines cut therethrough, and means for projecting light through the uncoated portion of said panel and said gauge lines, said light projecting means being disposed in a position wherein the direct rays thereof will not strike the eyes of the inspector.

ALFRED G. HEWITT.